United States Patent [19]

Patzke et al.

[11] 4,134,522

[45] Jan. 16, 1979

[54] CAP ASSEMBLY AND LOCK FOR AQUEOUS AMMONIA CONTAINER

[75] Inventors: Robert C. Patzke, Prospect Heights; Thomas V. DeRyke, Libertyville, both of Ill.

[73] Assignee: Addressograph-Multigraph Corporation, Los Angeles, Calif.

[21] Appl. No.: 756,783

[22] Filed: Jan. 5, 1977

[51] Int. Cl.$^2$ ............................................. B67D 5/32
[52] U.S. Cl. .................................. 222/153; 222/400.7; 222/483
[58] Field of Search ............. 272/400.7, 400.8, 402.11, 272/402.14, 483, 153; 354/300; 138/45; 215/207, 216, 219, 309, 311, 313; 251/104, 105, 292

[56] References Cited

U.S. PATENT DOCUMENTS

| | | | |
|---|---|---|---|
| 1,043,281 | 11/1912 | Wilton | 251/105 |
| 1,587,091 | 6/1926 | Vanadia | 251/104 |
| 2,161,911 | 6/1939 | Conill | 251/105 X |
| 3,035,603 | 5/1962 | Jamieson et al. | 222/400.7 X |
| 3,498,313 | 3/1970 | Belich | 222/400.7 X |
| 3,535,997 | 10/1970 | Blake | 354/300 X |
| 3,855,997 | 12/1974 | Sauer | 222/483 X |

*Primary Examiner*—Allen N. Knowles
*Assistant Examiner*—Fred A. Silverberg
*Attorney, Agent, or Firm*—Michael A. Kondzella; George Jameson; Robert S. Hulse

[57] ABSTRACT

A cap assembly is provided for use with a container for storing and supplying aqueous ammonia to a diazo type copying machine. The cap assembly comprises a closure member mounted on the container and a key device associated with free ends of an ammonia feed tube and a drain tube connecting the container to a developer system of the copying machine. The closure member includes a feed outlet to permit ammonia flow from the container to the feed tube and a drain outlet to permit ammonia flow from the drain tube to the container. The closure member also includes a seal adapted for selective actuation by the key device between a first position for closing the feed and the drain outlets to prevent ammonia flow and a second position for opening the outlets to permit ammonia flow. The key device is releasably retained by the closure member when the seal is in the second position and is released from the closure member when the seal is in the first position, to thereby prevent escape of ammonia fumes from the container to the ambient atmosphere during replacement of an empty container with a container providing a fresh supply of ammonia. The key device also includes a lock actuable between a locked position to prevent movement of the key device and actuation of the seal between the first and the second positions, and an unlocked position to permit movement of the key device.

3 Claims, 9 Drawing Figures

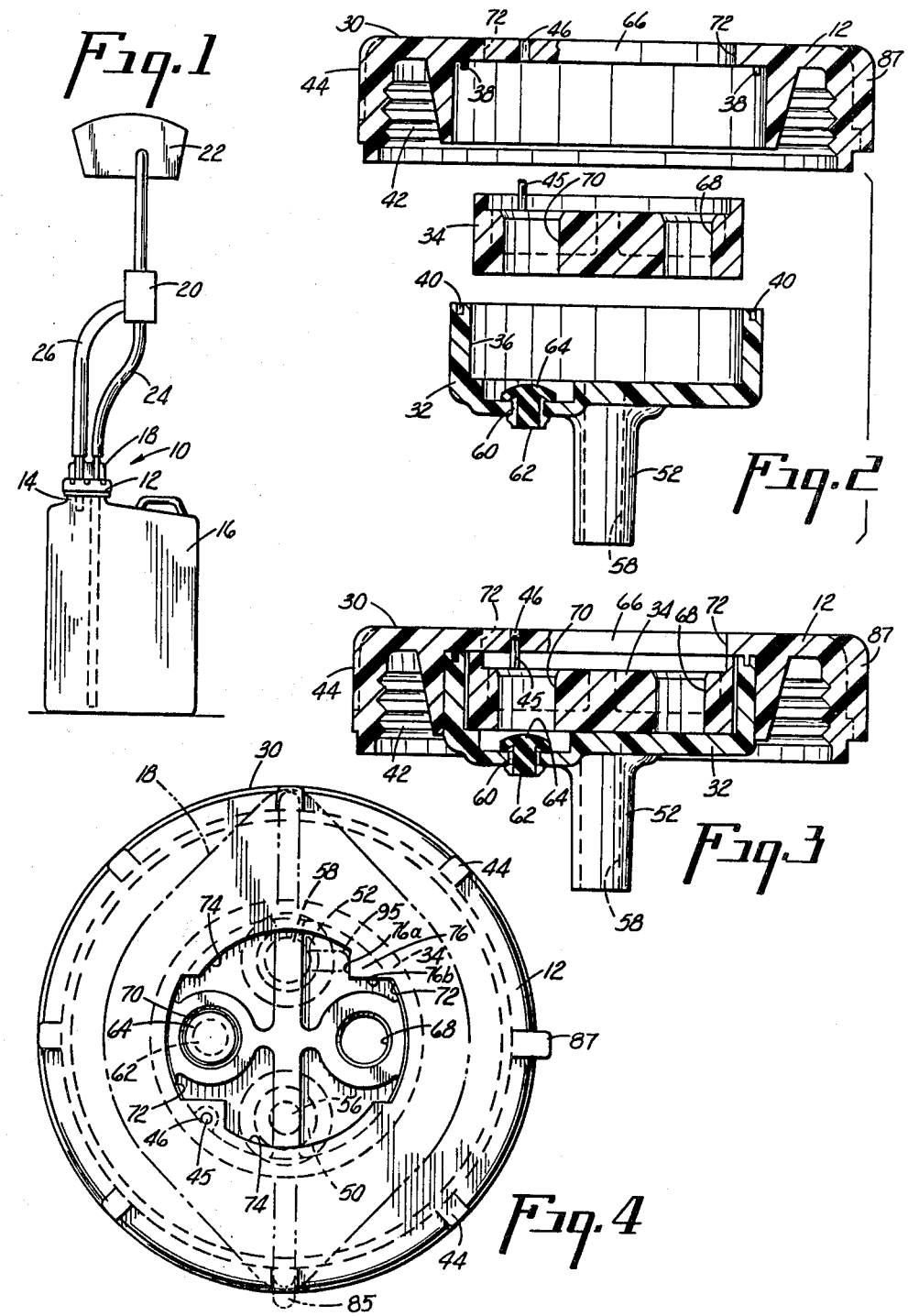

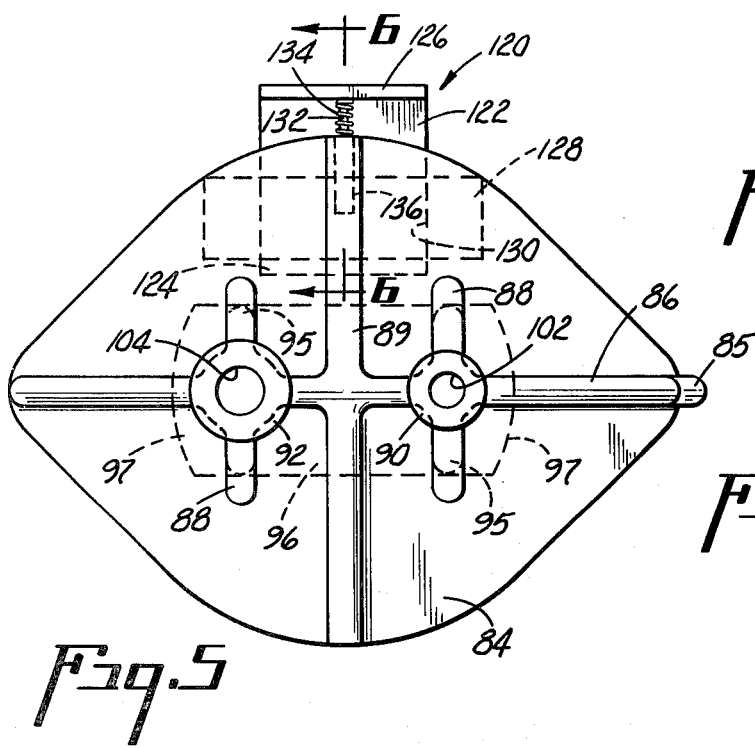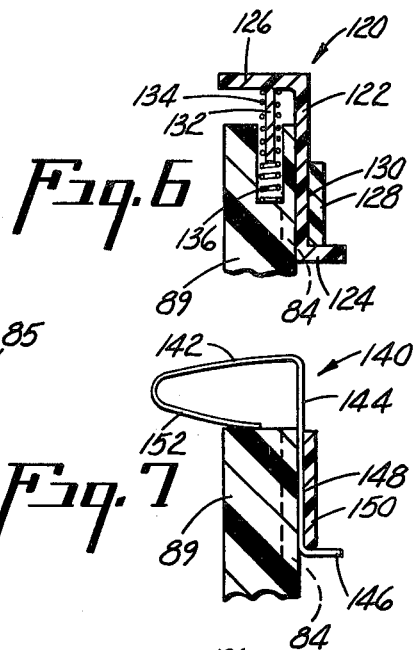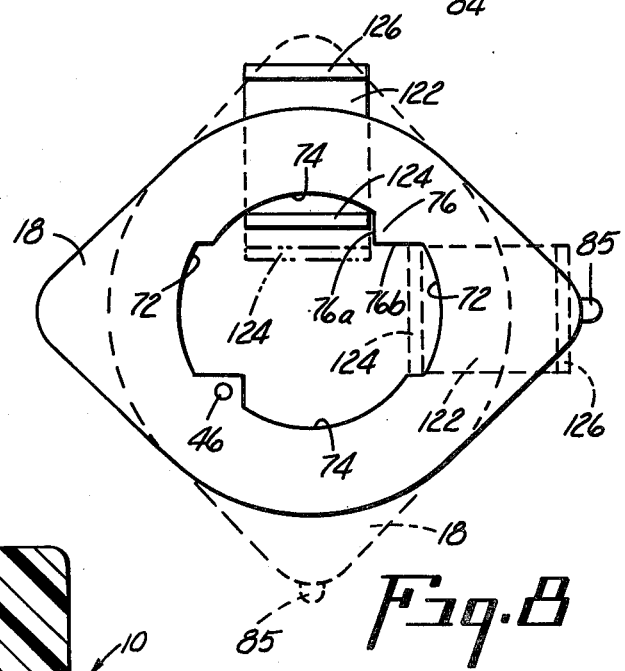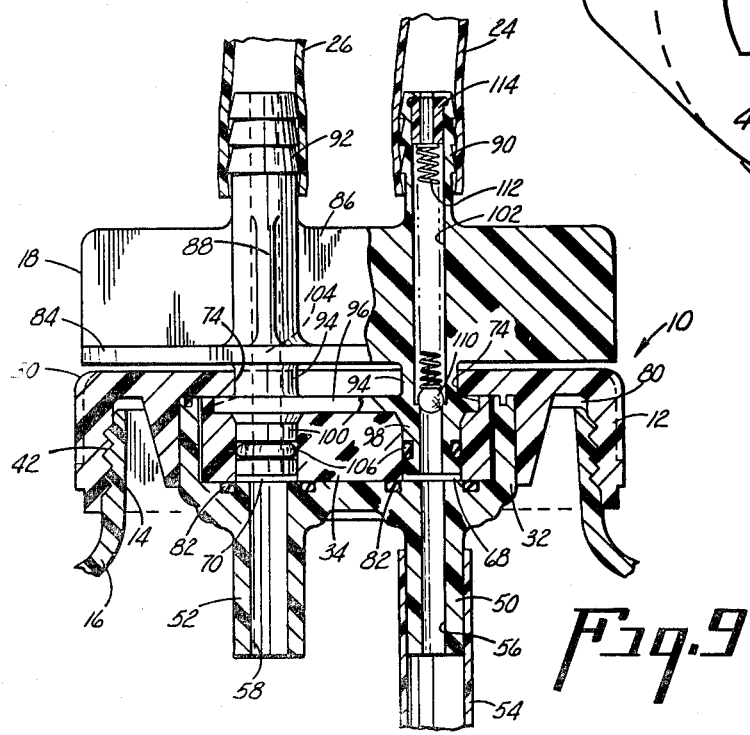

CAP ASSEMBLY AND LOCK FOR AQUEOUS AMMONIA CONTAINER

CROSS-REFERENCE TO RELATED APPLICATION

This invention is an improvement to the invention disclosed in copending application Ser. No. 708,054, now U.S. Pat. No. 4,082,206, filed July 23, 1976, assigned to the assignee of the present invention.

BACKGROUND OF THE INVENTION

Ammonia type diazo machines for the preparation of copies of translucent originals are well known in the art. In general, such machines are provided with a printer section where a high intensity light exposes sensitized material through an original document to be copied. A separator section then separates the original from the sensitized material and transports the sensitized material to a developer system. In the developer system, the exposed sensitized material is processed or developed by exposure to vapor of a volatile developing agent or ammonia gas. The developed copy is then transported from the developer section and provides a high quality permanent copy of the original document.

To supply the developer system with ammonia fumes for developing the copy, it is conventional practice to pump the ammonia from a shipping container to the developing system. In some instances, the unused ammonia is recirculated to the container to avoid escape of ammonia fumes to the atmosphere. One such arrangement is shown in U.S. Pat. No. 3,535,997. As shown therein, the device comprises a developer tray, a container of ammonia developer, a pump and two ducts. The first duct conveys the ammonia from the container to the tray and the pump circulates the ammonia vapor into the tray and, via the second duct, to the container.

While such an arrangement might reduce escape of ammonia fumes to the atmosphere during operation of the machine, it does not provide for preventing escape of ammonia fumes from the container during the interchange of an empty container with a container providing a fresh supply of ammonia. Hence, and as shown in the reference patent, in the course of interchanging the containers it is necessary to remove a plug from the empty container, remove a cap from the full container and to substitute the plug for the cap of the container providing the fresh supply of ammonia. In so doing, of course, the ammonia fumes and vapor from both the empty container and the full container are discharged to the ambient atmosphere until such time as the empty container is capped and the full container is provided with the plug for blocking the neck of the container. Because the device does not prevent the escape of ammonia fumes during the interchange of the containers, the room in which the machine is installed becomes fouled with objectionable ammonia odor.

SUMMARY OF THE INVENTION

The present invention provides a cap assembly for an ammonia container to permit interchange or replacement of one container with another without exposing the ammonia fumes in the containers to the atmosphere. The cap assembly includes a closure member releasably mounted on a neck of the container and a key means connected to the free ends of an ammonia feed tube and a drain tube extending from the container to a developer system of the copying machine. The closure member is provided with a feed outlet to permit ammonia flow from the container to the developer system via a pump metering system and feed tube, and a drain outlet is provided to permit ammonia flow from a pump overflow system to the container via the drain tube. A seal means is rotatably supported by the closure member and is adapted to be selectively actuated by the key means between a first position for closing the feed and the drain outlets and a second position for opening the outlets to thereby prevent or permit ammonia flow, respectively.

The key means, attached to the free ends of the feed and the drain tubes, is removably engageable with the seal means and is releasably retained by the closure member when the seal means is acutated to the second position. In response to the seal means being actuated to the first position, the key means is released from the closure member in readiness for actuating the seal means, associated with a container providing a fresh supply of ammonia, from the closed to the open position. In this way, because the outlets of the seal means are closed on the empty container prior to removal of the key means therefrom, and because the outlets on the seal means associated with the full container are not opened until the key means is engaged therewith and retained by the closure member, there is no escape of ammonia fumes from either the empty or the full ammonia container during the interchange of the containers.

The key means is also provided with a lock means actuable between a locked position to prevent actuation of the seal means between the closed and the open positions, and an unlocked position to permit movement of the key means for actuating the seal means between the closed and the open positions.

It is an object of the present invention to provide a cap assembly for an aqueous ammonia container to permit interchange of containers while preventing ammonia fumes from escaping from the containers to the atmosphere.

Another object of the invention is to provide a cap assembly for an ammonia container which eliminates the necessity of removing the shipping container cap when connecting the ammonia feed and drain tubes of the developer system of the copying machine to a container providing a fresh supply of ammonia.

Another object of the invention is to provide a cap assembly for an ammonia supply container including a closure member comprising a selectively actuable seal means movable between a closed position to prevent escape of ammonia fumes from the container when the cntainer is to be replaced or is in a shipping position, and movable to an open position to permit flow of ammonia when the container is in operative working association with the machine.

Another object is to provide a key means associated with the ammonia feed and drain tubes releasably engagable with the seal means for selectively actuating the latter between a position in which the feed and the drain outlets are closed to prevent ammonia flow and a position in which the outlets are open to permit ammonia flow.

Another object is to provide the key means with a lock means to prevent actuation of the seal means between the closed and the open postions unless the lock means is selectively actuated to an unlocked position.

A feature of the invention is to provide a cap assembly for an ammonia container in which the closure member includes retainer means for maintaining the seal means in the first position during storage and shipment of the container.

Other objects, features and advantages of the invention will appear hereinafter as the description proceeds.

IN THE DRAWING

FIG. 1 is a schematic showing the environment of a cap assembly for use with an aqueous ammonia container for storing and supplying ammonia to a developer system of a diazo type copying machine in accordance with the present invention;

FIG. 2 is an exploded view, in section, of a closure member of the cap assembly.

FIG. 3 is an assembly, in section, of the closure member of FIG. 2;

FIG. 4 is a plan view of the closure member showing a seal means thereof in a first position preventing ammonia flow;

FIG. 5 is a plan view of a key means, including a lock means, for actuating the seal means between the first and a second position;

FIG. 6 is a section of the lock means taken on the line 6—6 of FIG. 5;

FIG. 7 is a modified form of lock means;

FIG. 8 is a plan view of a portion of the closure member showing the locked and unlocked positions of the lock means; and FIG. 9 is a front elevation of the closure member and the key means, partially in section, showing the seal means in the second position permitting ammonia flow.

DESCRIPTION OF THE PREFERRED EMBODIMENT

With reference to FIGS. 1 and 9 there is shown a cap assembly indicated generally by the reference numeral 10. The cap assembly 10 comprises a closure member 12 releasably mounted on a flow opening or neck 14 of an ammonia container 16 and a key means 18 releasably engagable with the closure member 12. A pump 20 is provided for pumping ammonia from the container 16 to a developer system 22 via an ammonia feed tube 24, and any excess or ammonia overflow from the pump 20 is returned to the container 16 via an ammonia drain tube 26.

As shown best in FIGS. 2 and 3, the closure member 12 comprises an upper lid 30, a lower body 32 and a seal means 34 adapted to be rotatably supported in an opening 36 of the body 32. The lid 30 and the body 32 are preferably molded separately such that the seal means 34 may be positioned in the opening 36 prior to assembling and sonically welding the lid and the body to form a closure member 12 of integral construction for rotatably supporting the seal means 34 in the lower body of the closure member. To properly orient the lid 30 and the body 32 for a welding operation, the lid is provided with detents 38 which mate with corresponding notches 40 in the body when the lid and the body are in assembled relation. The lid 30, body 32, seal means 34 and the key means 18 are made of plastic or other suitable material resistant to attack by chemically reactive materials such as ammonia.

The lid 30 is provided with threads 42 for releasably securing the closure member 12 on the neck 14 of the container 16, and the periphery of the lid 30 may be provided with nubbins 44, as shown in FIG. 4, to facilitate gripping the closure member when it is secured to and removed from the container 16. As shown in FIGS. 2, 3 and 4, the closure member 12 also provides a retainer or cooperating means in the form of a pin 45 on the seal means 34 adapted to coact with a hole 46 in the lid 30 to maintain the seal means against inadvertent rotation or movement out of the first position during storage or shipment of the container 16. The pin 45 is flexible so as to be deflected out of the hole 46 when the seal means 34 is rotated from the first to the second position to permit ammonia flow.

With reference to FIG. 9, body 32 of the closure member 12 includes a depending connector 50 and a nozzle 52. The connector 50 supports one end of an inlet duct 54 extending to the bottom of the container 16 (FIG. 1) to permit emptying substantially all of the ammonia from the container as it is supplied to the developer system 22. The nozzle 52 terminates at a position near the top of the container 16 and provides for draining any excess of ammonia overflow from the pump 20 to the container via the drain tube 26. Also, the connector 50 is provided with a feed outlet 56 for passage of ammonia from the container 16 and the nozzle 52 is provided with a drain outlet 58 for passage of the ammonia to the container, as shown in FIGS. 4 and 9.

With reference to FIGS. 2 and 3, the body 32 is provided with a vent opening 60 for receiving therein a relief valve 62. The valve includes an enlarged head 64 overlying the opening 60, and a stem of circular cross section providing slight clearance betwen the stem and the opening 60. Thus, in response to pressure build-up in the container 16, the head 64 is caused to flex and the air passes upwardly through the clearance around the stem and out from under the head 64. In this way, the valve 62 is effective to continually control the release of minute quantities of air from the container 16, as required, while maintaining the vent opening 60 in a normally closed or sealed condition.

As shown in FIGS. 2, 3, 4 and 9, the seal means 34 is disc shaped and includes a pair of apertures 68 and 70 adapted to be selectively positioned into and out of alignment with the outlets 56 and 58 respectively, in response to rotative movement of the seal means 34 within the opening 36 of the closure member 12. The top wall of the lid 30 is provided with a key-hold opening 66 including open arcuate ends 72, opposed flanges 74 overhanging the periphery of the seal means 34, a corner stop member 76 having a stop surface 76a to prevent movement of the key means 18 and actuation of the seal means 34 from the first to the second position and for limiting rotative movement of the key means 18 when the seal means is actuated from the first to the second position, and a stop surface 76b to prevent movement of the key means and actuation of the seal means 34 from the second to the first position.

The seal means is rotatable between the first position as shown in FIG. 4 wherein the apertures 68 and 70 are out of alignment with the outlets 56 and 58 respectively, to maintain the outlets closed to prevent ammonia flow, and the second position as shown in FIG. 9 wherein the apertures 68 and 70 are aligned with the outlets 56 and 58 respectively, to maintain the outlets open to permit ammonia flow.

To prevent leakage or escape of ammonia fumes from the container 16, the closure member 12 is provided with a gasket 80 to seal the neck 14 of the container. Also, as shown in FIG. 9, an "O" ring seal 82 is positioned in a recess surrounding each of the outlets 56 and 58 to prevent passage of ammonia fumes from the container 16 through the apertures 68 and 70 to the atmosphere.

The key means 18 is shown in FIGS. 5 and 9 and comprises a plate member 84 including upstanding ribs 86 and 88 providing a finger grip to permit the machine operator to manipulate the key means for actuating the seal means 34, and a support rib 89 extending normal to the rib 86. A connector 90 is provided for mounting thereto a free end of the feed tube 24 and a connector 92 is provided for mounting a free end of the drain tube 26. The plate member 84 includes a pair of depending spacers 94 for supporting a retainer plate 96, and the retainer plate supports a pair of depending projections 98 and 100 adapted for releasable engagement with the apertures 68 and 70 respectively, of the seal means 34. The projections 98 and 100 are of different diameters, corresponding to the diameters of the apertures 68 and 70 respectively, to prevent incorrect insertion of the key means 18 and connection of the tubes 24 and 26 between the container 16 and the pump 20.

A further visual indicator is provided to aid the machine operator in properly engaging the key means 18 with the seal means 34. The indicator is in the form of a projection 85 at one end of the rib 86 of the plate member 84 and a projecting nubbin 87 provided on the periphery of the lid 30, as shown in FIGS. 3, 4, and 5. The projecting nubbin 87 is positioned on the horizontal centerline of the apertures 68 and 70 on the side of the lid 30 nearest the aperture 68 as shown in FIG. 4. The projection 85 is provided at the end of the rib 86 nearest the connector 90 as shown in FIG. 5. In this way, the key means 18 can be quickly oriented for proper engagement with the seal means 34 by aligning the projection 85 of the key means with the nubbin 87 on the lid 30 of the closure member 12 for actuating the seal means from the closed to the open position.

The connector 90, spacer 94 and the projection 98 are provided with a through opening 102, and the connector 92, spacer 94 and the projection 100 are provided with a through opening 104, to provide passages for ammonia feed and drain respectively, when the seal means 34 is in the second position as shown in FIG. 9. Each of the projections 98 and 100 is also provided with an annular groove for retaining an "0" ring seal 106 to prevent escape of ammonia fumes from the container 16 through the apertures 68 and 70 to the atmosphere.

As shown in FIG. 9, the key means 18 is also provided with a check valve comprising a ball 100 normally maintaining closed the opening 102, when ammonia is not being fed from the container 16, under the influence of a spring 112. The spring 112 is positioned in the opening 102, above the projection 98, and extends between the ball 110 and a retainer plug 114 provided at the open end of the connector 90. When the pump 20 is operating to supply ammonia from the container 16 to the developer system 22, the force of the pump overcomes the resistance of the spring 112, thereby causing the ball 110 to lift and permit passage of ammonia through the opening 102. This arrangement avoids dripping of ammonia or escape of ammonia fumes from the feed tube 24 when the key means 18 is removed from the seal means 34 of the closure member 12.

The key means 18 is releasably engagable with the seal means 34 for selectively actuating the seal means between the first position in which the outlets 56 and 58 are closed against ammonia flow, and the second position in which the outlets are open to permit ammonia flow. The key means 18 is inserted in the key-hole opening 66 with ends 97 of the retainer plate 96 aligned with the open arcuate ends 72 of the key-hole opening, the projections 98 and 100 are inserted into the apertures 68 and 70 respectively, of the seal means 34, and the key means, in response to actuation of a lock means as will be described below, is rotated in a clockwise direction to the position shown in phantom in FIG. 4. In so doing, the ends 97 ride under the flanges 74 which effectively hold the retainer plate as shown in FIG. 9. The key means 18 is arrested in the FIG. 4 position by a rib 95, extending from each of the spacers 94 as shown in FIG. 5, abutting the stop surface 76a associated with a corner stop member 76 of the keyhole opening 66. Thus, positive alignment is assured of the apertures 68 and 70 with the outlets 56 and 58 respectively, to allow ammonia flow.

With reference to FIGS. 5 and 6, the key means 18 is also provided with a lock means indicated generally by the reference numeral 120 comprising a body 122, an actuator or flange 126, and a blocking means comprising a tang 124. A guide member 128 is secured, as by sonic welding, to the underside of the plate member 84 at a position underneath the rib 89 of the plate member. The guide member 128 is provided with a recess 130 for slidably receiving therein the body 122 of the lock means 120 and for retaining the blocking means 124 in the locked position in abutting relation with the guide member 128.

The flange 126 includes a projection 132 for supporting one end of a compression spring 134 and the other end of the spring is positioned and retained in a blind hole 136 provided in the rib 89. In this way, the lock means 120 is spring loaded to normally maintain the tang 124 in a locked position, as will be further described hereinafter, and by depressing the flange 126 against the bias of the spring 134 the tang is actuated to an unlocked position.

The locked and the unlocked positions of the tang 124 of the lock means 120 are shown in FIG. 8. Thus, with the seal means 34 in the first position, and the key means 18 positioned in the key-hole opening 66 for rotating the seal means to the second position, the tang 124 is in the locked position shown in full lines in FIG. 8 as a result of the tang 124 extending downwardly in blocking engagement with the stop surface 76a of the corner stop member 76. This locked position prevents rotation of the key means 18 for actuating the seal means 34 from the first to the second position.

In response to depressing the flange 126 of the lock means 120, the tang 124 is displaced from the locked to the unlocked position shown in phantom in FIG. 8, thereby moving the tang 124 out of blocking engagement with the stop surface 76a to permit rotation of the key means 18 in a clockwise direction as viewed in FIG. 8. As the key means 18 is rotated the flange 126 may be released and the surface of the tang 124 merely rides against the corner stop member 76 under the influence of the spring 134 until such time as the seal means 34 has been actuated to its second position.

With the seal means 34 in its second position the tang 124 is restored to its locked position shown in dotted lines in FIG. 8, under the influence of the spring 134, whereby the tang is in blocking engagement with the stop surface 76b of the corner stop member 76. In this locked position the key means 18 is prevented from being rotated in the opposite direction to prevent actuation of the seal means 34 from the second to the first position. Although the lock means 120 is effective to lock the key means 18 against rotation in both directions, it is particularly important that the key means be prevented from inadvertent rotation when the seal means 34 is in the second position to avoid an operating malfunction as a result of stopping or decreasing the ammonia supply from the container 16 during machine operation.

When the seal means 34 is to be restored from the second to the first position, the flange 126 of the lock means 120 is again depressed thereby displacing the tang 124 to the unlocked position, out of the blocking engagement clear of the stop surface 76b of the corner stop member 76, the key means 18 is rotated in a counterclockwise direction as viewed in FIG. 8 and the flange 126 is released. In the closed position of the seal means 34 the tang 124 is again restored to its locked position, under the influence of the spring 134, in blocking engagement with the stop surface 76a.

FIG. 7 illustrates a modified form of a lock means, indicated generally by the reference numeral 140, which may be used in place of the lock means 120 described supra. While the lock means 120 may be constructed of any suitable plastic material resistant to attack by chemically reactive liquid such as ammonia, the lock means 140 is constructed of an integral member of stainless spring steel. The lock means 140 is formed to provide an actuator or finger grip 142, a body 144, a blocking means or tang 146 and a lip 152. The body 144 is slidably supported in a recess 148 provided in a guide member 150 which may be made of plastic and secured to the plate member 84 as by sonic welding.

This modified form of lock means 140 operates in a manner similar to and provides the same advantages as the lock means 120. Thus, in response to actuating or depressing the finger grip 142 for moving the tang 148 from the locked to the unlocked position, the lip 152 abuts the rib 89 of the plate member 84. Because of the spring construction of the lock means 140, abuttment of the lip 152 with the rib 89 causes the lip to be compressed such that when the finger grip 142 is released the bias of the lip restores the lock means to the locked position whereby the tang 146 is in blocking engagement with one of the stop surfaces of the corner stop member 76.

In the operation of the cap assembly 10, the container 16 of ammonia is stored and shipped with the closure member 12 secured on the neck 14 and the seal means 34 in the first position, as shown in FIGS. 3 and 4, where it is retained against inadvertent movement by the pin 45 and the hole 46 defining the retainer means. To connect the container 16 to the developer system 22, the machine operator merely inserts the key means 18 through the key-hole opening 66 and into engagement with the seal means 34, depresses the flange 126 to actuate the lock means 120 from the locked to the unlocked position and rotates the key means to the position shown in phantom in FIG. 4, to actuate the seal means to the second position, where it is arrested against further rotation by the rib 95 and the stop surface 76a. During this rotation of the seal means 34, the pin 45 snaps out of the hole 46 and the ends 97 of the retainer plate 96 are moved under the flanges 74 to hold the key means in an operative position with all of the ammonia flow passages in an open condition. With the seal means 34 in the second position, the lock means 120 is in locked position to prevent rotation of the key means 18 in the opposite direction.

When the ammonia supply in the container 16 is exhausted, the machine operator depresses the flange 126 to actuate the lock means 120 to the unlocked position and rotates the key means 18 in the opposite direction, thereby moving the retainer plate 96 out from under the flanges 74 and actuating the seal means 34 to the first position, shown in FIGS. 3 and 4, whereby all of the passages are closed to ammonia flow. In this position lock means 120 is again in the locked position and the key means 18 is lifted up and out of engagement with the seal means. The check valve associated with the key means 18 prevents any escape of ammonia from the feed tube 24 during removal of the key means from the closure member 12.

Thereafter, a container 16 providing a fresh supply of ammonia may be connected to the machine by actuating the seal means as described supra, and there is no leakage of ammonia fumes from the containers to the atmosphere during the interchange of containers.

From the foregoing, it will be appreciated that the present invention provides a cap assembly for an ammonia container for use with a diazo type copying machine which is simple in construction and use, and reliable in operation to prevent ammonia fumes from escaping from the container during interchange of an empty container with a container providing a fresh supply of ammonia. Because the closure member is releasably mounted on the container and may be used any number of times in the course of refilling the ammonia container, and since only a single key means is required for each machine installation, the cap assembly provides an inexpensive arrangement for effectively sealing the container against exposure of the ammonia to the atmosphere while permitting quick and easy actuation of the seal means in the opening and closing of the ammonia flow passages of the cap assembly. Further, the lock means provides a safeguard against inadvertent rotation of the key means and actuation of the seal means, particularly from the open to the closed position, to avoid an operating malfunction resulting from stoppage or an insufficient supply of ammonia to the developer system during machine operation.

What is claimed is:

1. A cap assembly for use with a container for storing and supplying a volatile developer liquid to a developer system of a copying machine, comprising:

a closure member of integral construction releasably mounted on a dispensing opening of the container and comprising an upper lid, a lower body and a seal means;

outlet means on the lower body for passage of the developer liquid from the container to the developer system;

vent means provided in the lower body for venting the container in response to pressure build-up of the developer liquid in the container;

said seal means rotatably supported by the lower body for actuation between a first position for closing the outlet means to prevent passage of the developer liquid from the container and a liquid supply position for opening the outlet means to permit passage of the developer liquid from the container;

key means releasably engageable with the upper lid for selectively actuating the seal means between the first position and the liquid supply position; and means for locking the key means against actuation when the seal means is in the liquid supply position to prevent inadvertent actuation of the key means and interference with the liquid supply from the container to the developer system.

2. A cap assembly for use with a container for storing and supplying a volatile developer liquid to a developer system of a copying machine, comprising:

- a closure member of integral construction releasably mounted on a dispensing opening of the container and comprising an upper lid, a lower body and a seal means;
- a feed outlet on the lower body for passage of the developer liquid from the container to the developer system;
- vent means provided in the lower body for venting the container in response to pressure build-up of the the developer liquid in the container;
- a drain outlet on the lower body for passage of the developer liquid to the container from the developer system;
- said seal means rotatably supported by the lower body for actuation between a first position for closing the feed outlet to prevent passage of the developer liquid from the container and a liquid supply position for opening the feed outlet to permit passage of the developer liquid from the container, said seal means including aperture means positionable into alignment with the feed and the drain outlets in response to actuation of the seal means to the liquid supply position, and positionable out of alignment with the feed and the drain outlets in response to actuation of the seal means to the first position;
- key means including opening means in alignment with the aperture means, said key means being releasably engageable with the upper lid for selectively actuating the seal means between the first and the liquid supply position;
- means for locking the key means against actuation when the seal means is in the liquid supply position to prevent inadvertent actuation of the key means and interference with the liquid supply from the container to the developer system; and
- means for selectively actuating the lock means to permit actuation of the key means when the seal means is in the liquid supply position.

3. A cap assembly as set forth in claim 1 wherein the upper lid and the seal means contain cooperating means for maintaining the seal means in the first position during storage and shipment of the container.

* * * * *